United States Patent
Bailey et al.

[15] 3,682,043
[45] Aug. 8, 1972

[54] FLOW CONTROL SYSTEM
[72] Inventors: Keith A. Bailey, Speedway; Jerry R. Marlow, Greenwood, both of Ind.
[73] Assignee: General Motors Corporation, Detroit, Mich.
[22] Filed: March 23, 1970
[21] Appl. No.: 21,950

[52] U.S. Cl. .................... 91/412, 91/418, 192/3.57, 137/110, 137/497, 74/733, 192/3.3
[51] Int. Cl. ......................... B60k 21/00, F15b 11/00
[58] Field of Search ........................ 91/412; 137/110

[56] References Cited

UNITED STATES PATENTS

| | | | |
|---|---|---|---|
| 3,338,256 | 8/1967 | Panissidi | 137/497 X |
| 3,128,642 | 4/1964 | Fisher et al. | 74/752 A |
| 2,500,627 | 3/1950 | Chinn | 91/412 X |
| 2,658,596 | 11/1953 | Archambault | 192/86 |
| 3,349,670 | 10/1967 | Bahl et al. | 91/412 |
| 3,348,644 | 10/1967 | Hilpert | 192/3.57 X |

FOREIGN PATENTS OR APPLICATIONS

| | | | |
|---|---|---|---|
| 887,194 | 1/1962 | Great Britain | 137/110 |

Primary Examiner—Benjamin W. Wyche
Attorney—W. E. Finken and A. M. Heiter

[57] ABSTRACT

A flow control system for a transmission having a torque converter with a lockup clutch and a multi-ratio gear unit having fluid motors to establish the ratio drives. The controls have a shift system including a shift valve selectively supplying each fluid motor with leakage make-up flow to maintain a ratio established and shift flow to establish another ratio, a lockup clutch valve to engage the lockup clutch and a flow valve tripped by a fast change in flow rate on initiating shift flow to disengage the lockup clutch and permitting slow changes in the leakage flow rate without tripping. These flows pass through a restriction providing a differential pressure which selectively actuates the trip control and the response control of the flow valve. The slowly increasing leakage flow rate actuates the response control which increases the size of the restriction or the return biasing force to permit slowly increased leakage flow without actuating the tripping control to trip the flow valve. The response control is unresponsive to the rapid increase of the shift flow rate which only actuates the tripping control to trip the flow valve.

8 Claims, 7 Drawing Figures

United States Patent
Bailey et al.
[15] 3,682,043
[45] Aug. 8, 1972
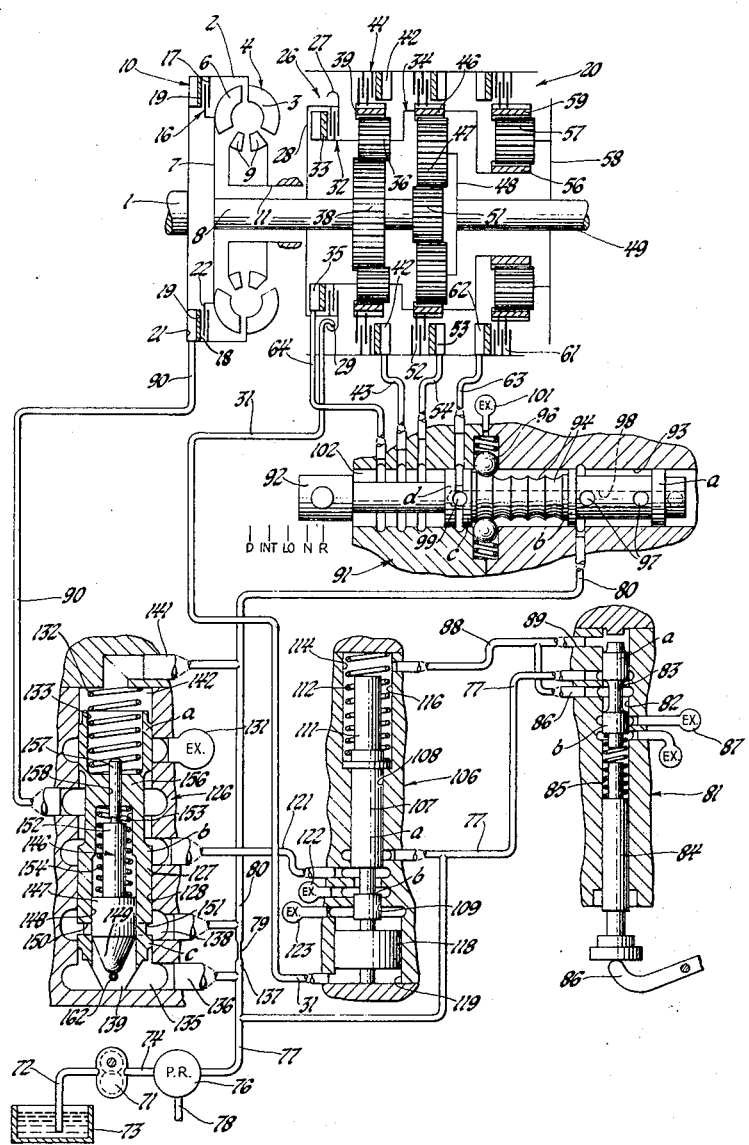

INVENTORS.
Keith A. Bailey &
Jerry R. Marlow
BY
a.m. Heiter
ATTORNEY

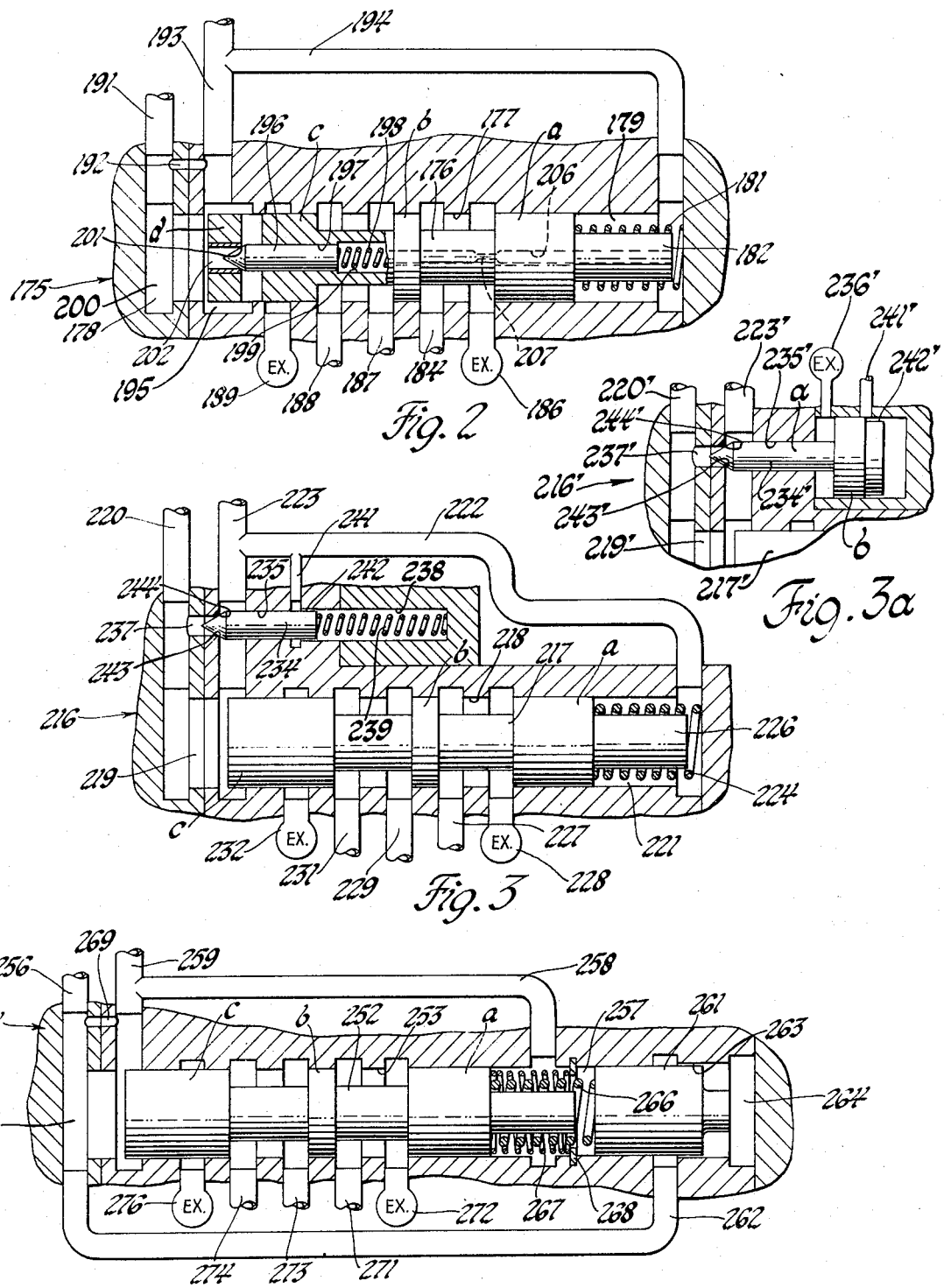

FLOW CONTROL SYSTEM

This invention relates to flow control systems and particularly to a flow control system selectively responsive to change of flow.

The invention provides an improved flow control system illustrated in a power shift transmission having a torque converter with a lockup clutch which is disengaged during a change in drive ratio. This arrangement is also useful in transmissions having a multi-ratio gear unit and another device, such as an input clutch or throttle reduction control, which is actuated in response to a shift change. A manually or automatically controlled lockup clutch valve controls the supply of fluid from a source to the lockup clutch to selectively engage the lockup clutch and a manually or automatically controlled shift valve controls the supply of fluid from a source to one or more operated devices such as ratio engaging devices to selectively establish a plurality of drive ratios. During the shift change for engagement of a drive ratio the rapidly increased flow of fluid from the source to the ratio engaging device is directed through a restriction to provide a pressure differential to actuate or trip a cut-off or flow responsive valve to control the supply of fluid to the lockup clutch to disengage the lockup clutch during the shift for engagement of a ratio. When the shift change is completed, the shift change flow ceases and the flow responsive valve is reset to the untripped condition. The flow responsive valve will not trip in response to slower increases in the flow rate in the operating range. The flow valve trips in response to a predetermined pressure differential due to rapidly increased flow in a short period of time, a high rate of change of flow rate, through a restriction between a source of fluid pressure and the shift control system or work system which includes the shift valve and the shift motors or operated devices. Each ratio drive is maintained established by leakage flow through the restriction to the shift system to make up system leakage and maintain or keep the fluid motor establishing the drive filled under pressure. Leakage flow, the normal flow to maintain a system condition, has a slow rate of change of flow rate with variations in wear and temperature. When leakage flow increases at a slow rate of change of flow rate it provides a slow increase in differential pressure which actuates a response control that after a time delay increases the size of the restriction so the differential pressure increases at a low linear rate with increasing flow rate or increases the return biasing force with differential pressure. On a shift change, the change of flow rate from the leakage flow rate to the shift change or operating flow rate has such a high rate of change of flow rate and the shift change is completed in such a short time period that the delayed response control does not significantly change the size of the restriction or return bias force so the differential pressure increases at a high parabolic rate relative to increasing flow rate to trip the flow valve and provide a controlled device, lockup clutch, disengaging signal. Since this signal indicates the presence of operating flow it is also called an operating signal and the signal before the valve trips indicating the absence of operating flow is an inoperating signal.

One type of flow or cut-off valve trips from the lockup supply position to the lockup cut-off position in response to a rapid increase in the flow rate occurring over a small time period flowing through a restriction to cause a high predetermined pressure differential but will accommodate even larger slow increases in the flow rate occurring and existing over a longer period of time and only cause a lower pressure differential insufficient to trip the flow valve. Fluid supply for a ratio change causes a rapid increase in the flow rate and gradually increased leakage in the shift control system slowly increases the flow rate with changes in operating conditions, shifting, wear and temperature, over the life of the transmission. The small time period required for tripping the flow valve in response to shift flow is less than that required to take up the slack in any ratio being engaged so that the flow valve trips to disengage the lockup clutch before torque transmittal in the new ratio is initiated and maintains it disengaged during the completion of the engagement of the new ratio. Gradual slow increases in the flow rate across the restriction caused by leakage are accommodated by a response control, a time delayed variable restriction control valve, which will function, when there is an increased flow for a period longer than that required for a complete ratio change, to increase the size of the restriction so that the increased flow is accommodated with a lower and linear rate of increase of pressure differential with increasing leakage flow. A slow increase in flow rate larger than the rapid increase in flow rate for ratio change may be accommodated without providing the predetermined pressure differential which trips the flow valve. Thus the flow valve will remain in the open position over a wide range of gradually changing leakage flow values but will operate from any of these flow values in response to a smaller rapid change in flow value caused by a shift change to trip the flow valve to close, providing a signal to disengage the lockup clutch. The restriction has a primary or initial calibrated restriction and increases in size or has a secondary variable restriction in parallel increasing the size of the initial restriction in accordance with slowly increasing flow existing for a period of time longer than the shift change period to gradually increase the size of the restriction. Thus the rate of increase of pressure differential with slowly increasing flow rate existing longer than the shift cycle period due to the increasing size of the restriction is linear and thus reduced as compared to the parobolic rate of increase of differential pressure with a rapidly increasing flow rate existing for a shorter period due to the constant size restriction.

In another flow valve the return bias force is gradually increased with slowly increasing leakage flow to increase the pressure differential required to trip the flow valve with gradually increased flow. A sudden or fast change in flow rate during a shift change will not change the bias force and will trip the flow valve.

An object of the invention is to provide in a control system having a plurality of fluid operated devices, a controlled device and a control valve to selectively supply fluid flow to a selected fluid operated device with a fast change of operating flow rate to operate the selected operated device and with maintaining flow having a slow change of flow rate to maintain operation of the selected operated device and a flow control selectively tripped by said operating flow to provide a signal to control the controlled device and not tripped by the maintaining flow in an operating range and including a response control permitting wide changes in the maintaining flow and unaffected by the operating flow.

Another object of the invention is to provide in a transmission having a drive clutch, a fluid operated multi-ratio gear unit, a clutch control to selectively operate the clutch and a shift control supplying a rapidly increased fluid flow during a shift for engagement of a drive ratio, a flow responsive control operative during said rapidly increased fluid flow to disengage said clutch and functioning to accommodate a gradually increasing fluid flow rate without disengaging the clutch.

Another object of the invention is to provide in a transmission having a drive clutch, a fluid operated multi-ratio gear unit, a clutch control to selectively operate the clutch and a shift control supplying fluid at a rapidly increased rate of flow during a shift for engagement of a drive ratio, a flow responsive control operative during the rapidly increased fluid flow across a restriction to disengage the clutch and functioning to accommodate a gradually increased fluid flow rate without disengaging the clutch by gradually increasing the size of the restriction.

Another object of the invention is to provide in a transmission having a drive clutch, a fluid operated multi-ratio gear unit, a clutch control to selectively operate the clutch and a shift control supplying fluid at a rapidly increased rate of flow during a shift for engagement of a drive ratio, a flow responsive control operative during the rapidly increased fluid flow to move against a bias to disengage the clutch and functioning to accommodate a gradually increased fluid flow rate without disengaging the clutch by gradually increasing the bias.

Another object of the invention is to provide in a transmission having a torque converter with a fluid operated clutch and a plurality of fluid operated ratio engaging devices and a control system to supply fluid pressure across a restriction and selectively connected to establish each of the ratio establishing devices and a flow valve operative in a downshift position to engage the clutch and in an upshift position to disengage the clutch and responsive to the pressure differential caused by a rapid change of the rate of flow during the shift for establishing a ratio and existing for the short time period required for the shift establishing a ratio to disengage the clutch and restriction control means responsive to a gradual slow increase in the rate of flow and pressure differential over a longer time period to accommodate increased flow without providing a similar increase in pressure differential.

Another object of the invention is to provide in a fluid pressure control system having a fluid motor operated on the supply of fluid through a restriction at an increase in flow rate existing for a short period of time which provides a predetermined pressure differential value and a control device operative in one position in response to a predetermined flow and pressure differential to the fluid motor existing for a short time interval less than that required to operate the fluid motor and a restriction control operative in gradual changes in flow across the restriction caused by leakage downstream of the restriction occurring for a longer period of time to increase the size of the restriction to accommodate such gradually increased flow with a lower pressure differential insufficient to actuate the flow responsive valve.

Another object of the invention is to provide in a fluid pressure operated control system having a valve controlled passage to selectively supply fluid under pressure to operate a fluid motor for a short period of time and a control device having a variable size restriction in the valve controlled passage providing, in response to changes in the flow rate for operating the motor and existing for such a short period of time, a pressure differential across the restriction operative at a predetermined value to shift the control device without significantly varying the size of the restriction and providing, in response to smaller incremental changes in the flow rate due to gradually increased leakage in the system and existing for a longer period of time than the period of time of motor operation, an increased size restriction to accommodate an increased leakage flow rate at a lower increase in the differential pressure without shifting the control device.

Another object of the invention is to provide in a fluid pressure operated control system having a valve controlled passage to selectively supply fluid under pressure to operate a fluid motor for a short period of time and a control device having a restriction and a variable bias for providing, in response to changes in flow rate for operating the motor and existing for such short periods of time, a pressure differential across the restriction operative to shift the device without significantly varying the bias and operative, in response to gradual changes in flow existing for longer periods of time, an increased bias to accommodate gradually increased flow without shifting the control device.

These and other objects of the invention will be more apparent from the following description and drawings.

FIG. 1 schematically shows the transmission and control system including the flow controlled cut-off valve.

FIG. 2 shows a modified flow controlled cut-off valve.

FIG. 3 shows another modified flow controlled cut-off valve.

FIG. 3a shows a modification of FIG. 3.

FIG. 4 shows another modified flow controlled cut-off valve.

TRANSMISSION DRIVE TRAIN

Figure 1:
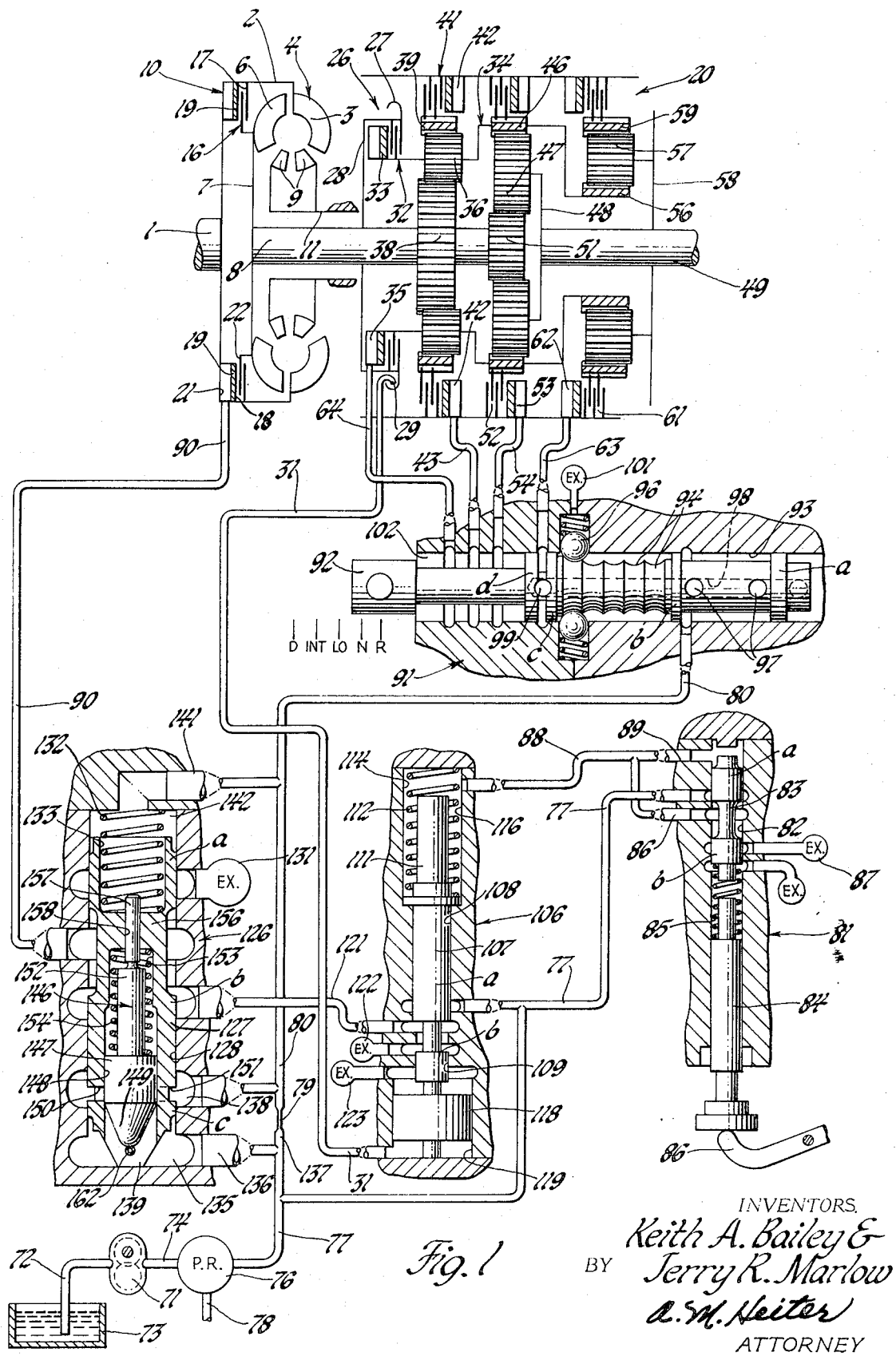

The drive train illustrated diagrammatically in FIG. 1 includes a torque converter and lockup clutch unit 10, and a three-speed and reverse gear unit 20. The engine or input shaft 1 is connected to drive the rotary torque converter housing 2 which carries the bladed pump or impeller 3 of the torque converter 4. The torque converter pump hydrokinetically drives the bladed turbine 6 which is mounted by disc 7 on the converter output shaft 8. The torque converter 4 has two stators 9 mounted on the ground sleeve 11. Fluid is supplied to the operating chamber of the converter by a conventional converter inlet line and exhausted by an outlet line, which are connected to the control system in a conventional manner.

The input shaft 1 may also be connected to the converter output shaft 8 by the direct drive or lockup clutch 16. The direct drive clutch 16 has a fixed plate 17 fixed on the rotary housing 2 and an axially movable plate 18 formed as a face of the annular piston 19 non-rotatably located in the cylinder 21. The driven plate 22 is located between the fixed plate 17 and the movable plate 18 and is connected by disc 7 to shaft 8. When fluid is supplied through the lockup clutch line 90 to the servo motor consisting of piston 19 and cylinder 21, the driven clutch plate 22 is engaged between the movable plate 18 and the fixed plate 17 to engage the direct drive clutch 16.

The pitot tube governor 26 has an annular trough or can 27 mounted on driving disc and drum element 28 and a pitot tube 29 on the housing to supply fluid to the pitot governor line 31 at a pressure proportional to the speed of the converter output shaft 8. The high clutch 32 has plates rotating with element 28 and plates rotating with a drum 33 and connects the driving element 28 via drum 33 to the carrier assembly 34 when the clutch is engaged. The high clutch is engaged when fluid is supplied by high clutch line 64 to high clutch motor 35. The carrier assembly 34 includes the intermediate planetary pinions 36 which mesh with the intermediate sun gear 38 fixed to shaft 8 and intermediate ring gear 39. To provide intermediate ratio, the intermediate ring gear 39 is stopped by ratio brake or ratio engaging device 41 when actuated by the intermediate motor 42 under the control of fluid supplied by the intermediate clutch line 43. The carrier assembly 34 also includes the low ring gear 46 which meshes with the planetary pinions 47 mounted on carrier 48 fixed to output shaft 49. The low sun gear 51 fixed to shaft 8 meshes with planetary pinions 47. Low ratio is provided by stopping the ring gear 46 and incidentally the carrier assembly 34, by means of the low ratio brake or ratio engaging device 52 which is actuated by the motor 53 when pressure is supplied by the low clutch line 54.

The carrier assembly 34 also includes the reverse sun gear 56 which meshes with the reverse pinions 57 rotatably mounted on carrier 58 fixed to output shaft 49. The reverse ring gear 59 is held stationary for reverse drive by ratio brake or ratio engaging device 61 when engaged by motor 62 on the supply of fluid by the reverse clutch line 63. The motors or the associated brakes or clutches for each ratio engaging device may have conventional retraction springs (not shown).

TRANSMISSION GEARING OPERATION

This gearing arrangement provides three forward speed ratios and a reverse ratio in the three-speed and reverse unit 41. The three-speed unit provides low ratio when the low ratio device 52 is engaged to hold low reaction ring gear 46 so that the input sun gear 51 drives pinions 47 and output shaft 49 at a reduced speed for low ratio. When intermediate ratio device 41 is engaged, the three-speed unit functions as a compound planetary gear. The intermediate reaction ring gear is held and the input sun gear 38 drives carrier 34 which rotates low ring gear 46 to drive, in conjunction with input sun gear 51, the output pinions 47 and shaft 49 at an intermediate ratio. High ratio is provided by engaging the high ratio device 32 to lock the carrier 34 to shaft 8 to lock up the three-speed unit for direct drive or high ratio.

CONTROLS

The hydraulic control and lubrication system for this transmission is supplied with oil under pressure by the engine driven pump 71 which draws the fluid, such as oil, via inlet line 72 from the transmission sump 73 and is connected to deliver oil through the pump line 74 to the conventional pressure regulator valve 76 which regulates the pressure supplied to main line 77 and thus provides a source of regulated fluid pressure. The excess fluid is connected in a conventional manner by line 78 to supply the torque converter operating system, the lubrication system and to keep the pitot can filled. The main line 77 also feeds through the primary orifice 79 to the ratio change line 80 or operated device passage supplying the shift motors or operated devices.

THROTTLE VALVE UNIT

The throttle valve unit 81 supplies a throttle pressure responsive to the throttle pedal position to control the lockup clutch valve. The throttle valve elements are located in bore 82 in the valve body and includes a throttle regulator valve element 83 and an actuator element 84. When the engine fuel feed control 86, actuated by the throttle pedal, is in the closed position, the valve element 81 is in the closed position. Then the throttle valve 83 having lands $a$ and $b$, is located in the bore 82 so that the upper land 83$a$ blocks flow of oil from the main line 77 to the bore 82. Also the land $b$ is located below throttle pressure port 86 and exhaust port 87 and the space between the lands connects the throttle line port 86 to exhaust port 87 to exhaust the throttle pressure in line 88. The throttle line 88 is also connected to the port 89 adjacent the closed end of the bore 82 so that the throttle pressure acts down on land $a$.

The actuator element 84 is controlled by the accelerator pedal (not shown) which is connected by a linkage including lever 86 which engages the end face of actuator element 84 to move it into the bore 82 and increase the pressure exerted through spring 85 on the throttle regulator valve 83. The throttle valve unit 81 provides throttle pressure in line 88 directly proportional to the throttle pedal position.

The manual valve 91 connects ratio change line 80, supplied by the main line 77, in reverse R to the reverse clutch line 63, in drive D to the drive or high clutch line 64, in intermediate INT to intermediate clutch line 43, and in low LO to the low clutch line 54. The valve 91 has an element 92 having lands $a$, $b$, $c$ and $d$ of equal diameter located in a bore 93. A series of annular grooves 94 located between the lands $b$ and $c$ cooperate with a detent 96 to resiliently position the valve in each of the positions, R, N, LO, INT and D. The line 80 is connected to the bore 93 between the lands $a$ and $b$ in all positions of valve element 92, and thus is continuously connected by ports 97, a central bore 98 and port 99 through the valve element 92 to the space between the lands $c$ and $d$. In the reverse position illustrated the space between the lands $c$ and $d$ is connected to the reverse line 63 to supply fluid to reverse ratio engaging device 61-62. Similarly moving the valve to the other positions LO, INT and D connects the space between the lands c and d to supply fluid respectively to low line 54, intermediate line 43 and drive line 64. In neutral the space between the lands c and d is blocked. In all positions the lines not connected to the main line 77 by the space between the lands c and d are exhausted via exhaust 101 or exhaust 102 at the open end of the bore 93.

LOCKUP VALVE UNIT

The lockup valve unit 106 (FIG. 1) automatically controls the lockup clutch 16. The lockup valve element 107 has a land a in a bore 108 in the valve body, and a land b of smaller diameter which fits in a smaller diameter bore portion 109. The valve element 107 has a stud 111 extending above land a which serves to limit the upward or opening movement and locate spring 112 in the spring chamber 114. The spring 112 engages the end of chamber 116 and the valve to resiliently urge the valve 107 in a closing direction. The throttle pressure is connected by the throttle pressure line 88 to the spring chamber 116 to act on the free end of land 107a and close valve 107 to tend to disengage the lockup clutch. The converter output governor pressure in line 31 acts on the lower face of the lockup plug 118 located in an enlarged portion 119 of the bore 108 to move valve 107 toward open position. When the valve is in the closed position, illustrated, the land 107b blocks the main line 77 and the governor controlled lockup feed line 121 is connected between the unbalanced lands a and b to the exhaust 122. Exhaust 123 provides a drain between valve 107 and plug 118 to prevent the accumulation of oil under pressure due to leakage.

The lockup valve 107 is controlled by spring 112 and the throttle pressure from line 88 acting to close the valve against the governor pressure from line 31 acting to open the valve. When the governor pressure increases sufficiently due to the increase in the intermediate shaft (8) speed to overcome the spring force and the throttle pressure, the valve 107 moves and land a uncovers the main line 77 and permits oil under pressure to flow between lands 107a and b to act on the unbalanced area of lands a and b to tend to hold the valve 107 open to prevent hunting and to provide a hysteresis loss so that a downshift will only occur at a lower speed. With valve 107 in the open position, the main line 77 is connected to the lockup clutch feed line 121 and to the lockup cut-off valve 126 which connects to the lockup clutch line 90 except during a shift as explained below. At this time the land 107b closes exhaust port 122.

If desired, the lockup valve 107 may be controlled by the spring 112 acting against the front governor pressure without throttle pressure.

LOCKUP CUT-OFF OR FLOW VALVE UNIT

The lockup cut-off or flow responsive valve unit 126 (FIG. 1), which disengages the lockup clutch 16 during each ratio shift change interval, includes a hollow valve element 127 having lands a, b and c located in a bore 128 of uniform diameter. With the valve and its lockup clutch control signal means in the normally open position, as illustrated, the controlled lockup feed line 121 and the lockup clutch line 90 are connected by the space between the lands a and b and the exhaust port 131 for the lockup clutch line 90 is blocked by the land 127a for lockup clutch engagement. A main spring 132 positioned in one end, spring chamber 142, of bore 128 urges the valve 127 to this lockup clutch line opened position and determines the short time interval differential pressure which will trip the valve from open to closed position. The spring 132 is positioned in a large bore 133 in the top end of the valve element to locate and limit the compression of this spring. Main line 77 is connected upstream of restriction 79 by port 136 to upstream pressure chamber 135 at the lower end of bore 128 and through passage 137 having primary restriction 79 therein to the ratio change line 80 which is connected downstream of restriction 79 to port 141 and downstream pressure and spring chamber 142. The main line pressure is connected by port 136 to upstream pressure chamber 135 in the bore 128 beneath the valve element 127 to act on the free end of land c spaced from the end of the bore by spacer projections 139. The downstream and upstream pressures in chamber 135 and chamber 142 respectively act on the full included equal areas of land c and land a, respectively, within the bore 128, since the restriction control valve 146 prevents passage of fluid completely through the bore in cut-off valve 127, that is from chamber 135 to chamber 142 in all positions of restriction control valve 146. When the leakage flow rate is low, the restriction control valve 146 is closed, all the fluid flows through primary orifice 79 and there is insufficient pressure differential in chambers 135 and 142 to overcome spring 132 so cut-off valve 126 is in the normal open position shown. When this pressure differential exceeds the spring force, as during ratio shifting requiring a higher flow rate, the valve 126, flow responsive means, is closed relative to lockup feed or tripped, moving valve element 127, to limit the pressure drop across primary orifice 79 by opening a bypass restriction between land 127c and port 138, to limit and reduce the flow restriction from main line 77 to the ratio change line 80 which is connected to supply the shift system, manual valve unit 91 and the ratio motors, and to provide a signal, by land b cutting off the fluid supply from line 121 to lockup clutch feed line 90 and connecting line 90 to exhaust 131, to disengage the lockup clutch. Thus valve 126, its element 127 and associated passages provide signal means to provide this signal.

The hollow valve element 127 has therein restriction control means including a restriction regulator valve element 146 having a large land 147 located in a large bore portion 148 and a conical end portion 149 cooperating with three radial ports 150 connected to groove 151 in element 127 between lands b and c for providing a variable restriction 147-150, a stem portion 152 in a spring chamber 153 for restriction regulating spring 154 which engages the land 147 and the internal wall 156 and a restriction portion 157 having a clearance fit providing a time delay restriction, in bore 158 in wall 156. Groove 151 is connected to port 138 in all positions of cut-off valve 127 so only variable restriction control valve 146 controls the variable restriction 147-150 connection between upstream port 136 and downstream port 138. Portion 157 is a self cleaning restriction portion since its movement with valve 146 cleans the restriction provided by the small clearance between this portion 157 and the bore 158 but also functions as a pressure control portion since pressure in chamber 142 acts on it and a guide portion since it guides the upper end of the regulator valve element 146. This time delay restriction 157–158 provides restricted flow between downstream pressure chamber 142 in bore 128 and restriction regulating spring chamber 153 in the hollow valve element 127. Spring 154 biases valve 146 so land 147 closes the restricted passage between conical portion 149 and port 150 when the bottom of land 147 engages stop pin 162. The above controls for varying restriction 147–150 are flow response varying means.

When a ratio drive is merely being maintained by the low flow rate from the source main line 77 to the ratio motors to make up leakage, the flow valve unit 126 is held in its normal or open position shown by the force of spring 132. The opposing upstream pressure from main line 77 and downstream pressure from ratio change line 80 acting on the equal area end faces of cut-off or flow valve element 127 and restriction regulator valve element 146 are equal, if no leakage flow, or provide a pressure differential due to leakage flow providing a force less than the force of spring 132 so valve element 127 remains in the open position. Normally there is a low flow and pressure differential due to leakage in the ratio shift control system downstream of the orifice 79. Whenever there is a sudden increase in the rate of fluid flow through ratio change line 80 to effect a change in ratio by filling one of the ratio motors, as distinguished from a slow change or variation in the flow rate due to a change in the leakage flow rate, fluid flows from the main line 77 through the restriction 79 creating a higher pressure difference between the higher fluid pressure in the main line 77 acting on the lower end face of land $c$ and land 147 and the lower fluid pressure in ratio change line 80 which acts on the opposite end face of land 127a and restriction control valve portions 157, 152 and 147 having a total area equal to the full area of land 147.

Figure 5:
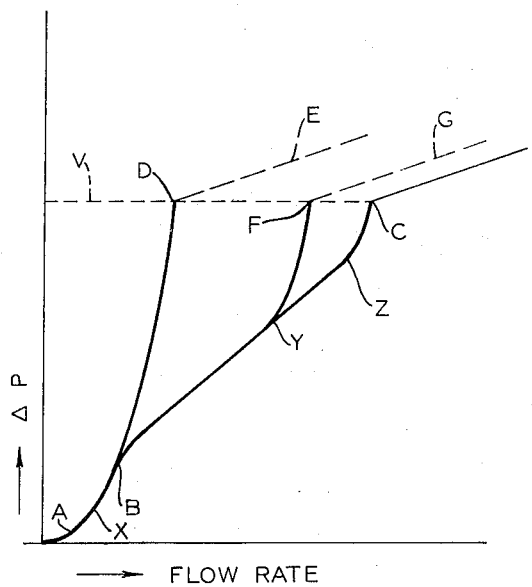
FIG. 5 shows curves illustrating the relation of the flow rate and the pressure differential in the flow valves shown in FIGS. 1 to 3.

As shown in FIG. 5 when the leakage downstream of orifice 79 is low the normal, condition maintaining a leakage flow is low or has a low flow rate, for example X on curve AB, a portion of curve AD which illustrates the square or parabolic relation between flow rate and differential pressure $\Delta p$ when only the fixed primary restriction 79 is open. At a low leakage flow rate, the differential pressure is low, restriction control valve 146 closes the secondary restriction ports 150 and the valve 127 remains down in the open position shown. Rapidly increased shift flow or operating flow having a high rate of increase of flow rate through supply passage, lines 77–80 and restriction 79 to effect a ratio change increases differential pressure along curve XD which is parabolic, illustrative of flow through a fixed size restriction because, the operating flow exists only for a short period of time, there is insufficient time for restriction control valve 146 to change the size of the restriction. At a specific pressure differential pressure value V, the differential pressure force is greater than the spring (132) force and valve 127 trips. The signal means of the valve then connects lockup clutch line 90 to exhaust 131 and blocks controlled feed line 121 to operate a controlled device, the lockup clutch 16. Substantially simultaneously land $c$ opens a bypass restriction between ports 136 and 138 to reduce the rate of increase of the pressure differential with increasing flow as shown by curve DE. The pressure applied to the ratio clutch motors is reduced at the beginning of each shift change interval. When the ratio motor is substantially filled, establishing the new ratio, shift flow stops. As the flow slows down and returns to leakage flow, the normal flow having a low rate of increase of flow rate, the pressure differential is reduced and at pressure differential V, spring 132 opens or returns the valve 127. It is preferred that the valve element 127, when tripping or closing and when returning or opening respectively, disestablish and establish the lockup clutch substantially at the same pressure differential and time or valve position that the bypass restriction is open or closed respectively but this may occur at a slightly lower or higher pressure differential than value V at which the bypass restriction 127c–138 is open or closed. The flow valve in response to ratio change operating flow provides an operating control signal or lockup clutch disengaging signal and in response to normal leakage flow or inoperating flow, not changing the ratio, provides an inoperating control signal or lockup clutch engaging signal.

When the leakage in the ratio control system downstream of restriction 79 is low, the leakage make-up flow rate will be low and the flow valve 126 will function at a point, i.e., X on the curve AB as explained above. Main pressure line 77 connected by port 136 to chamber 135 which acts on the cut-off valve element 127 in a closing direction also acts on the restriction regulating valve element 146 to open the secondary restriction between land 147 and ports 150. This tripping force on the valve 126 is opposed by the spring 132 and the lower downstream pressure connected by port 141 to chamber 142 which biases the cut-off valve in the return direction also biases the restriction regulating valve element 147 toward the closed position. If there is a pressure drop in line 80 between ports 138 and 141, the latter should be connected to line 80 just downstream of restriction 79 like port 138. This downstream pressure acts on the end of restriction portion 157 and also passes through the timing restriction between portion 157 and bore 158 to fill the chamber 153 between the wall 156 and land 147 and between the valve elements 127 and 146 to act on portion 152 and land 147 and thus acts on the full included area of land 147 like the upstream pressure in chamber 135, but in an opposite direction. In this initial phase of operation at low leakage flow rates on curve AB, the upstream pressure acting on lands $c$ and 147 does not overcome the force of the spring 132 and the slightly lower downstream fluid pressure in chamber 142 acting on the upper ends of the valve elements 127 and 146 so valve 127 is closed. Also upstream pressure acting on the free end of land 147 does not overcome spring 154 and downstream pressure on portions 157, 152 and the other end of land 147 so the restriction control valve 146 is closed. As the leakage or normal flow increases beyond point B, the pressure differential will increase and the restriction control valve will be biased in an opening direction and if this pressure bias continues in effect for a period longer than the short ratio change or operating time period, this biasing force will force some fluid from chamber 153 back through the timing restriction 157,158 to permit or cause the valve 146 to open the restriction 147,150 at a very gradual rate. Then the slowly increased flow due to increased normal leakage which exists over a long period of time will, because the total area of restrictions, which includes primary restriction 79 and secondary restriction 147-150 is slowly increasing in size, more slowly increase the pressure differential with increasing leakage flow as indicated by the curve BZ. Both restrictions and the passages connecting the differential pressure to act on the flow valve 126 provide flow sensing means. Thus the rate of increase of the pressure differential with slowly increasing flow rate is minimized or reduced throughout a major portion of the flow rate range of operation or a large range of flow rates as compared to the rate of increase of pressure differential with increasing flow rate at the initial mode of operation. If leakage flow has increased to any value along curve BZ, i.e., Y, the flow valve 127 will operate in the steady state closed position at Y with the restriction control valve 146 holding the secondary restriction 147-150 partially opened to provide in response to the high flow at point Y a pressure differential less than value V required to trip the flow valve. Then, if a ratio change is made, there is a rapid increase or variation in operating flow as indicated by the curve YF. The secondary restriction 147,150 will not significantly change because of the time delay restriction 157-158 and flow valve 127 will function, with substantially fixed primary and secondary restrictions as established at point Y, along the curve YF to trip the flow valve when the pressure differential reaches the predetermined value V and at the same time open bypass restriction between land c and port 138. As explained above with regard to point D on curve XE, at point F on curve YG land c opens port 136 to port 138, a bypass restriction, to the primary restriction 79 and the secondary restriction 147,150 connecting ports 136 and 138 permitting the filling of the ratio motor with little further increase in differential pressure and/or restriction as indicated by the curve FIG.

At point Z, the restriction control valve is fully open so secondary restriction 147,150 cannot be increased in size to accommodate increased leakage flow and the pressure differential increases parabolically due to the fixed restriction along curve portion ZC and the flow valve will trip at C. Thus the operating range in which the flow valve will function is from zero leakage flow rate to a value sufficiently less than the flow rate at C to prevent tripping due to leakage flow. The curve portion BZ is a linear curve and has a low slope or rate of increase of differential pressure with increasing flow rate due to the rate of spring 154. The land c of flow valve element 127 overlaps port 138 and during the increase in differential pressure along curve BC there is slight movement but land 127c does not open the bypass restriction until pressure differential value V is reached at point C. If the spring 154 were longer and had a lower rate, less increase in spring force with opening movement of restriction control valve 147, the slope of curve BZ would be reduced and if a rateless biasing force pressure (as shown in FIG. 3a), were employed, curve BZ would be horizontal indicating a constant differential pressure with increasing leakage flow. The initial curved portion of curve BZ is due to turbulence.

The modified flow responsive cut-off valve 175, shown in FIG. 2, is similar to the above described flow valve 126 and has a valve element 176 having lands a, b, c and d of equal diameter located in a bore 177 having an upstream pressure chamber 178 at one end of the bore and a downstream pressure chamber 179 at the opposite end of the bore. A spring 181 engaging the end of the bore and the valve biases the valve element 176 from the closed position shown to an open position. The spring is guided by stop pin 182 which also limits valve opening or upshifting movement. In the closed position, the lockup clutch line 184, like line 90 in FIG. 1, is connected to exhaust 186 to disengage the lockup clutch and the lockup clutch feed line 187 is connected to a trimmer control line 188 which would control clutch trimming as shown for example in the Fisher et al. U.S. Pat. No. 3,128,642 issued Apr. 14, 1964. The exhaust 189 is blocked by land c. In the open position, exhaust 186 is blocked by land a, lockup feed line 187 is connected to lockup clutch line 184 to engage the lockup clutch and the trimmer control line 188 is connected to exhaust 189. The main line 191 is connected to the upstream chamber 178 to act on the free end of land d and by the primary restriction 192 to the ratio change line 193 which is connected to a ratio shift control valve and by a branch 194 to the downstream chamber 179 to act on the free end of land a. The secondary restriction control valve 196 is located in a bore 197 within the valve element 176 and is biased by a spring 198 located in a chamber 199 and engages the valve element 176 at the end of chamber 199 and the restriction control valve 196 to bias valve 196 to close the secondary restriction 201 formed between the seat 202 in the bore 197 and the seat on the end of the valve element 196. Only controlled restriction 201 controls flow in the restriction passage from upstream chamber 178 to radial ports 200 and port 195 which is always connected to port 195 of ratio change line 193. The downstream pressure chamber 179 is connected by passage 206 having a timing restriction 207 through the valve element 176 to the chamber 199 therein.

The main line or upstream pressure in chamber 178 acts on the land d of the valve element 176 and the restriction control valve 196, while the ratio control line or downstream pressure downstream of restriction 192, which is less than the main line pressure, is connected by branch 194 to downstream chamber 179 and through passage 206 to chamber 199 to, during low leakage flow, hold the flow valve 176 open and the secondary restriction control valve 196 closed. Then the flow valve functions as described above with regard to FIG. 1 in the range of steady state curve AB. At a steady state leakage position, i.e., X, on a shift rapidly causing a high flow rate from main line 191 to line 193 and a ratio motor, the differential pressure rise across restriction 192 with variable restriction 201 closed will be on curve XD. The flow valve 176 will trip or close to the lockup clutch disengaged position and land d will open chamber 178 to line 193 to open the bypass restriction and reduce the increase in pressure differential with increasing flow as indicated by curve DE for freer flow to quickly fill the ratio motor. The gradual increase of the leakage flow rate will gradually open variable restriction 201 increasing the differential pressure along a curve similar to curve BZ. Basically this flow valve functions like the flow valve 126 of FIG. 1, but provides a construction permitting a smaller diameter or longer spring having a lower or zero spring rate.

Another modified flow valve 216, FIG. 3, is like flow valve 175 but the restriction control valve is separate from the flow valve. The flow valve 217 has lands $a$, $b$ and $c$ of equal diameter located in a bore 218 having an upstream pressure chamber 219 connected to the main line 220 and a downstream pressure chamber 221 connected by a branch 222 of the ratio change line 223. A spring 224 is located in the downstream chamber and seats on the valve body and the valve element and is guided by a spring guide and valve stop member 226 on the valve element. With the valve in the closed position shown, the lockup clutch apply line 227, which is equivalent to the lockup clutch apply line 90 in FIG. 1, is connected to exhaust 228 while the lockup clutch feed line 229 is connected to a similar trimmer regulator line 231. In the open position, land $a$ blocks exhaust 228 and the lockup clutch feed line 229 is connected to the lockup apply line 227 while the trimmer valve regulator line 231 is connected to exhaust 232. The restriction regulator valve element 234 is located in a separate bore 235 in the valve body and controls a secondary restriction 237 between the main line 220 and the ratio feed line 223 which bypasses the upstream pressure chamber 219 in the valve bore. The bore 235 has a closed end chamber 238 having a spring 239 therein which biases the restriction regulator valve 234 to the closed position. The ratio change line 223 has a branch 222 connected by a branch 241 to the bore 235 and is connected by the clearance 242 between the valve element 234 and bore 235 to the chamber 238. This clearance between two relatively movable parts is self cleaning and functions as the timing restriction between ratio feed line 223 and the chamber 238. A controllable restriction 243 is provided between suitable seat surfaces on the restriction passage 237 and the valve element 234 instead of providing the primary restriction by a separate restriction between main line 191 and ratio feed line 193 as in FIG. 2. The primary restriction may be provided by a suitable separate primary restriction 244 in a portion of the seat of restriction 243. Then the valve will function like the flow valves in FIG. 1 and 2. If a separate primary restriction is not used, the primary restriction is provided by calibrating the spring force and the areas of valve 234 on which the differential pressure acts so that the valve is open at the normal minimum leakage flow rate to provide the primary restriction, the valve would operate entirely on a curve similar to the curved portion BC, as described above.

In FIGS. 2 and 3 the variable restriction control valve 196 and 234 has a longer spring 198 and 239 having a lower spring rate providing a lower rate of increase of differential pressure with increasing flow rate. In FIG. 1 and 2 primary restrictions 79 and 192 can be like primary restriction 244 of FIG. 3 or a restriction through land $c$ FIG. 1 or land $d$ FIG. 2.

A further modification, FIG. 3a, provides a rateless restriction control valve 235' which is a modification of restriction control valve 235 and functions similarly with flow valve 216 in FIG. 3. The flow valve 216' is structurally like flow valve 216 except the restriction control valve 235' has a small portion $a$ and a larger land $b$ and bore 235' is stepped to fit these portions and has an exhaust 236' at the step. The upstream pressure in main line 220' acts on portion $a$ and downstream pressure connected by branch line 241', passes in all valve positions through timing restriction 242, a partial or full annular, very small, space (0.002 in.) between the land and bore, to the end of the bore to act on the end of land $a$ opposing the upstream pressure to provide rateless increase of the secondary restriction 244' with increasing differential pressure with increasing leakage flow. This flow valve 216' functions like the above flow valves except the curve portion BZ is rateless or horizontal.

The above flow valves trip to provide a signal in response to a rapid change in flow rate occurring during a drive or ratio change having a small increase in shift flow rate, i.e., the increase in flow rate between points X and D or points Y AND F over a wide or wider range or difference between the minimum and maximum leakage flow rate for proper operation, i.e., the difference in flow rates at point A and a flow rate almost to point C but sufficiently less so the flow valve will return. A system restriction between the source or upstream portion of the system and the downstream portion, the ratio change control system having a shift valve and motors, provides a pressure differential to operate the cut-off or flow responsive valve and the variable restriction control valve. Both valves modify or change the size of the system restriction. The cut-off valve on tripping increases the size of the system restriction, by opening a bypass restriction, in parallel with a fixed or initial restriction, at a predetermined differential pressure, preferably substantially equal to the differential pressure at which the cut-off valve trips to limit differential pressure rise during ratio change. The variable restriction control valve increases the size of the system restriction, preferably by increasing the size of a controlled restriction also in parallel with the fixed restriction, in response to a slowly increasing flow rate and an increasing differential pressure existing for a period longer than the shift cycle time. The shift change flow has a rapid increase in flow rate and though it has a high rate, it does not exist for a sufficiently long period of time to actuate the restriction control.

The flow valve system which includes a flow valve and variable restriction control valve distinguishes between slow changes in the flow rate, a low rate of change of flow rate, which would be caused by gradual changes in the leakage rate, a condition maintaining or normal rate, in the system, i.e., the ratio change system, downstream of the restriction and rapid changes in the flow rate, a high rate of change of flow rate, which would be caused by the higher rates of flow, an operating flow rate, used to operate on operated device such as to fill the motors and make up leakage in a ratio change system. The time delay restriction in the connection of the downstream pressure to the restriction control valve is small in size and long so that in the short time, i.e., 0.3 seconds required for a shift change, there will not be any significant flow through it to move the restriction control valve so the secondary variable restriction will not significantly change in size. Thus, during a ratio change the flow valve trips in response to a predetermined pressure differential due to the parabolically increasing differential pressure caused by increased shift flow of short duration across a system restriction which has a constant size because the flow does not exist for a sufficient time to actuate the variable restriction control valve. Gradual increases in the flow rate due to increasing leakage will occur in small increments much smaller than the increase in flow rate for ratio change. After such a gradual increase is present for a period longer than the shift change period, the differential pressure, delayed by the time delay restriction acts on the restriction control valve to gradually increase the size of the secondary variable restriction and thus the system restriction to linearly increase differential pressure at a low rate with increasing flow rate. Also, when the flow valve trips the system restriction is quickly increased by a larger degree substantially simultaneously with the action of the control function, the disengagement of the lockup clutch, and increased with increasing flow rate to reduce the rate of increase of pressure differential with increasing flow rate. In FIG. 1, the system restriction includes the fixed primary restriction 79, the variable controlled secondary restriction 147–150 which increases in size to accommodate increased leakage flow at a low pressure differential increase and the bypass restriction between land c of valve element 127 and port 138 which opens quickly on a shift at the predetermined pressure differential. The restriction control valve 146 for controlling the secondary restriction has a cylindrical land working in a straight bore providing a simple durable structure and the timing restriction 156–157 is between two relatively movable parts for self cleaning. In FIG. 2, the system restriction includes the primary fixed restriction 192, the secondary variable restriction 201 and the bypass restriction between land 176d and ratio change line 193. The small variable restriction control valve 196 has a cone face seating on a hardened sleeve 202 and a simple bore type timing restriction 207. The above concentric flow valve and restriction regulator valve arrangements provide a compact structure. In these arrangements, it should be noted (as in FIG. 1) that the controlled restriction passage from the main line 77, and upstream chamber 135 to the ports 150, groove 151, port 138 and the ratio change line 80 which is only controlled by the variable restriction control valve 146 is otherwise connected in all positions of the cut-off valve. In FIG. 3, the system restriction includes an initial restriction provided by a slot restriction 244 or an initial partially open position of valve 234 which further opens to provide the variable increasing restriction to correct for leakage and the bypass restriction between land c and ratio change line 223 opening on a shift. The small variable restriction control valve 234 is at one side of the cut-off valve and has a self cleaning timing restriction 242 between two relatively movable parts.

The modified flow control regulator valve 251 shown in FIG. 4, has a valve element 252 having lands a, b and c located in a bore 253 having at one end an upstream chamber 254 connected to main line 256 and at the other end a downstream chamber 257 connected by branch 258 to the ratio change line 259. The downstream chamber 257 is located in the bore 253 between the cut-off valve element 252 and a cut-off plug 261. The main line 256 has a branch 262 connected to the bore 253 at the control plug 261 which is connected by a clearance space 263 providing a timing restriction between the main line and the closed control chamber 264 at the end of the bore 253. A control spring 266 is located between the plug 261 and the valve element 252. A grounded spring 267 is located between the flow valve element 252 and an abutment snap ring 268 secured to the valve body and grounding the spring 267 to the valve body. A primary non-variable restriction 269 is provided between main line 256 and ratio change line 259.

The flow valve 252 in the closed position shown, connects the lockup clutch apply line 271 to exhaust 272 and the lockup clutch feed line 273 to the trimmer control line 274. In the open position, the valve connects the lockup clutch feed line 273 to the lockup clutch apply line 271 and the trimmer regulator line 274 to exhaust 276. At a low initial leakage flow rate, the low differential pressure in control chamber 264 and downstream chamber 257 provides a low force biasing control plug 261 toward the cut-off valve element 252 and this low force is balanced by spring 266 which transmits and grounds this force through the cut-off valve element 252. The spring 266 exerts this low or minimum force while holding the control plug near the end of the bore with the flow valve element 252 in the open position. Thus, during low leakage flow the control plug 261 is in the extreme right and the flow valve at the extreme left or open position. The grounded spring 267 and spring 266 holds the cut-off valve 253 in this open position. The initial low leakage flow from main line 256 through orifice 269 to ratio feed line 259 which provides the above low pressure differential with the higher pressure also in upstream chamber 254 and the low pressure in downstream chamber 257 as stated above, does not have sufficient pressure differential to overcome ground spring 267 and spring 266.

Figure 6:
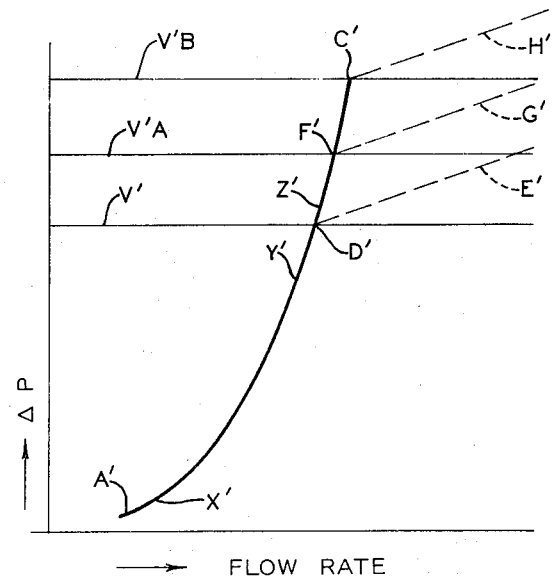
FIG. 6 shows curves illustrating the relation of the flow rate and the pressure differential in the flow valve of FIG. 4.

FIG. 6 shows a curve A'D' illustrating the differential pressure $\Delta p$ with increasing flow rate and X' a typical low initial leakage flow rate at which the flow valve element 252 remains in the open position. When a shift change is made, this pressure differential increases, as indicated by curve X'D', and there is sufficient pressure differential to trip the shift valve at differential value V' at point D' on curve X'D' to connect the lockup clutch apply line 271 to exhaust 272 and substantially at the same time to connect main line 256 via chamber 254 with less restriction to ratio feed line 259 to reduce the rate of increase of pressure differential with increasing flow as indicated by curve D'E'. When the ratio shift is completed, the high flow for the ratio shift ceases and the continued normal low leakage flow, providing a lower pressure differential, permits the grounded spring 267 and control spring 266 to return the cut-off valve 252 from E' to D' to X' to re-establish lockup clutch drive.

While moderate increases in the leakage flow rate along the curve X'D' toward D' would not change this mode of operation, increases near and particularly at point D' or above on curve D'F' would render flow valve operation uncertain or hold the flow valve closed at all times. Thus with increasing normal leakage flow rate the downshift spring bias is increased to raise the pressure differential value at which the flow valve trips. If leakage flow increases to a higher value, i.e., Y', the downstream pressure in chamber 257 will be reduced providing an increased pressure differential. If this increased pressure differential persists for a period of time longer than the time required for any ratio change, the fluid at main line pressure connected via branch 262 will flow through the timing restriction 263 to the chamber 264 in significant volume to significantly move the control plug toward the cut-off valve until the increased differential pressure is balanced by the increased force of spring 266. This increased spring force will raise the pressure differential required to trip the flow valve to a new higher value V'A. With normal leakage operating at point Y', a ratio change causing increased flow will trip the flow valve 252 at point F' to, as explained above, disengage the lockup clutch and open the bypass restriction so the pressure differential relative to increasing flow is along the curve F'G'. Further increase in leakage flow to a still higher point, i.e., Z' will similarly further increase the bias of spring 266 so the cut-off valve trips at a higher or highest differential pressure V'B at point C' and thereafter differential pressure rises more slowly as indicated by curve C'H'. It will be appreciated that small increments of increase of leakage flow will gradually move control plug 261 toward the cut-off valve 252 until the control plug 261 engages stop ring 268 and this will gradually increase the force of spring 266 acting on the cut-off valve and gradually increase the differential pressure from V' to V'B at which the cut-off valve shifts. In FIG. 4 the system restriction is fixed and the opening or return bias provided by springs is increased with increasing leakage to increase the differential pressure at which the cut-off valve trips to accommodate for increased leakage flow. The timing restriction 262 is self cleaning as the two parts have relative movement.

These flow responsive control valves provide a control signal in response to fast changes in the flow rate of short duration, such as occur during motor operation for transmission ratio shifting, but do not provide a control signal in response to slow changes in the flow rate which exist for longer periods of time which are caused by increasing system leakage because slow changes in flow rate modify the response control to reduce the response to flow but fast changes have no significant effect on the response control Thus a change in the leakage or steady state flow rate even the same or larger in magnitude than the magnitude of the fast change can be accommodated without tripping the flow valve. Thus leakage changes due to wear, temperature change and differences in the leakage of the motors is accommodated over a wide range for increased transmission life.

Where the motors have different leakage flow rates, on a shift from a first motor having higher leakage flow to a second motor having lower leakage flow, the shift change flow to the second motor must be greater than the leakage flow of the first motor.

In the above description reference to the position or direction, i.e., up or down, of the valves or movement thereof on the drawing is merely for convenience since the valves will function in any position.

From the above described modifications it will be appreciated that other modifications may be made.

What is claimed is:

1. In a control system; a passage having different fluid flows, a normal fluid flow at normal flow rates slowly variable through a large range of flow rates during long periods of time and at times an operating flow rapidly varied by a value smaller than said range of flow rates from any of said normal flow rates in said large range of flow rates to a higher operating flow rate existing only for a short operating period of time flowing from a source to an operated device line; flow responsive means operatively connected to said passage, having signal control means operatively connected to and controlled by the flow responsive means, responsive to said operating flow throughout said range of flow rates to provide an operating control signal indicating the presence of operating flow and unresponsive to said normal flow throughout said range of flow rates to provide an inoperating control signal indicating the absence of operating flow; automatic flow response varying means operatively connected to said flow responsive means and being unresponsive to said rapidly varied operating flow and responsive only to said slowly variable normal flow at all rates in said range of flow rates existing for a long period of time, longer than said short operating period of time, to control said flow responsive means when said flow responsive means is providing said inoperative control signal to prevent response of said flow responsive means to said slowly varied normal flow throughout said range of flow rates to continue to provide said inoperating control signal and to provide response to said rapidly varied operating flow from any normal flow rate by a value smaller than said range of flow rates throughout said range of flow rates to provide said operating control signal.

2. In a control system; a passage having different fluid flows, a normal fluid flow at normal flow rates slowly variable through a large range of flow rates during long periods of time and at times an operating flow rapidly varied by a value smaller than said range of flow rates from any of said normal flow rates in said range of flow rates to a higher operating flow rate existing only for a short operating period of time flowing from a source to an operated device line; flow responsive means including flow sensing means operatively connected to said passage to provide a differential pressure varying with flow in said passage and signal means operatively connected to said flow sensing means and responsive to a predetermined magnitude of differential pressure to provide a control signal; automatic flow responsive varying means operatively connected to said flow sensing means and responsive only to said normal flow rate existing for a long period of time, longer than said short operating period of time, to control said flow sensing means to vary the proportion of differential pressure to the flow rate with variations in the magnitude of said normal flow rate before said predetermined differential is provided to prevent providing said predetermined differential pressure in response to said slowly variable normal flow rates throughout said range of flow rates and maintaining said flow sensing means responsive to said operating flow rapidly varied by a value smaller than said range of flow rates from any of said normal flow rates throughout said range of flow rates to a higher flow rate to provide said predetermined differential pressure.

3. In a control system; a passage having different fluid flows, a normal fluid flow at an initial normal flow rate which is slowly variable during long periods of time over a large range of flow rates and at times an operating flow rapidly varied from any of said normal flow rates by a smaller amount than said range of flow rates to a higher operating flow rate varying with variations in normal flow rate and existing only for a short operating period of time flowing from a source to an operated device line; flow responsive means operatively connected to said passage having signal means operatively connected to the flow responsive means and responsive to a pre-set magnitude of flow rate different from said initial normal flow rate and provided by said operating flow rate at said initial normal flow rate to provide a control signal; automatic control means operatively connected to said flow responsive means responsive only to said slowly variable normal flow existing for a long period of time, longer than said short operating period of time, operative to vary said pre-set magnitude of flow rate for response by said flow responsive means with variations in the magnitude of the flow rate of said normal flow to provide a varied pre-set magnitude of flow rate always different from the rate of normal flow as it varies over said large range of flow rates to prevent said normal flow throughout said range providing any pre-set magnitude of flow and said operating flow providing a pre-set magnitude of flow from any normal flow.

4. In a control system; a passage having different fluid flows, a normal fluid flow at normal rates slowly variable through a large range of flow rates during long periods of time and at times operating flow rapidly varied by a value smaller than said range of flow rates from any of said normal flow rates to a higher operating flow rate existing only for a short operating period of time flowing from a source to an operated device line; flow responsive means, including a variable size restriction in said passage providing a differential pressure and control means operatively connected to said passage, responsive to a predetermined differential pressure to provide a control signal; automatic restriction control means operatively connected to said variable size restriction of said flow responsive means to control the size of said variable size restriction responsive to the lower differential pressure provided by said slowly variable normal flow and existing for a period of time longer than said operating period to increase the size of said restriction with increasing normal flow and differential pressure to prevent providing said predetermined differential pressure and control signal by any slowly varied normal flow rate throughout said range of flow rates and to prevent increasing the size of said restriction by any rapidly varied operating flow rate and to provide said predetermined differential pressure and control signal in response to a flow increase from any normal flow to said higher operating flow in said range of flow rates.

5. In a fluid flow responsive controls, flow responsive means having a flow passage with a variable size restriction for motor operating flow and motor leakage flow in the same range of flow rate values operative to provide a signal in response to a predetermined pressure differential across the variable size restriction in the flow passage and automatic restriction size control means operatively connected to said flow passage and variable size restriction means of said flow responsive means for increasing the size of the restriction in response to increasing motor leakage flow increasing at a slow rate of change of flow rate to provide a minimal increase in differential pressure to prevent providing said predetermined pressure and said signal in a range of flow rate values and maintaining the size of the restriction substantially constant over a short period of time to provide in response to a fast rate of increase of motor operating flow in said range of flow rate values a large increase of differential pressure to said predetermined differential pressure to provide said signal.

6. In a hydraulic flow responsive device selectively operative responsive to the rate of change of flow rate to provide a signal indicative of flow condition; flow responsive control means having a first and a second position; signal means operatively connected to said flow responsive control means and providing a signal in one position of said flow responsive control means; automatic variable flow sensing and control means for sensing fluid flow in a passage and operatively connected to said flow responsive control means for controlling the position of said flow responsive control means and selectively operative to maintain said flow responsive control means in said first position during and in response to a large change of fluid flow rate at a low rate of change of fluid flow rate throughout a large range of fluid flow rates and operative to position said flow responsive control means in said second position in response to a smaller change of fluid flow rate at a high rate of change of fluid flow rate within said large range of fluid flow rates.

7. In a hydraulic flow sensing device selectively operative responsive to the rate of change of flow rate to provide a signal indicative of flow condition; a source of fluid under pressure; a passage for supplying fluid to a work system; a first chamber connected to said source; a second chamber connected to said passage; control means movably sealed between said chambers for movement between a first position and a second position and having opposed faces exposed to the fluid in said chambers; automatic control biasing means, including flow restriction means connected for flow between said source and passage providing a pressure differential in response to flow acting in said chambers on said opposed faces of said control means and responsive to differential pressure to position said control means in said second position in response to a high rate of change of fluid flow rate through said restriction means during a small change of flow rate within a larger range of flow rates and to maintain said control means in said first position during and in response to a low rate of change of fluid flow rate through said restriction means during a change of flow rate throughout said larger range of fluid flow rates and signal means operatively connected to said control means to provide an operating signal in response to movement of said control means between said first and second positions.

8. In a hydraulic flow sensing device selectively operative responsive to the rate of change of fluid flow rate to provide a signal indicative of flow condition; a source of fluid under pressure; a passage for supplying fluid to a work system; automatic flow restriction means connected between said source and passage for connecting said source to said passage and automatically controlled by differential pressure providing a high pressure differential in response to a high rate of change of fluid flow rate during a small change of flow rate in all portions within a larger range of flow rates and a low pressure differential in response to a low rate of change of fluid flow rate throughout said larger range of fluid flow rates automatically controlled by differential pressure; a first chamber connected to said source; a second chamber connected to said passage; control means movably sealed between said chambers, having opposed faces exposed to the fluid in said chambers and having a first position adjacent said first chamber and movable to a second position adjacent said second chamber; biasing means operatively connected to said control means to bias said control means toward said first chamber to a first position against said low pressure differential and permitting movement of said control means toward said second chamber from said first position to said second position in response to said high pressure differential and signal means operatively connected to said control means to provide an operating signal in response to movement of said control means to said second position.

* * * * *

PO-1050
(5/69)

UNITED STATES PATENT OFFICE
CERTIFICATE OF CORRECTION

Patent No. 3,682,043            Dated    August 8, 1972

Inventor(s) Keith A. Bailey et al

It is certified that error appears in the above-identified patent and that said Letters Patent are hereby corrected as shown below:

In the specification, column 8, line 47, "feed" should be deleted from between the words "clutch" and "line" and inserted between the words "from" and "line"; column 9, line 46, "a" should be -- or --; column 11, line 45, "FIG" should be -- FG --; column 16, line 41, "low" should be -- lower --; column 17, line 39, "262" should be -- 263 --.

Signed and sealed this 19th day of November 1974.

(SEAL)
Attest:

McCOY M. GIBSON JR.                C. MARSHALL DANN
Attesting Officer                  Commissioner of Patents